(12) United States Patent
Kyoya et al.

(10) Patent No.: US 7,458,034 B2
(45) Date of Patent: Nov. 25, 2008

(54) DATA ORGANIZATION SUPPORT METHOD AND PROGRAM PRODUCT THEREFOR

(75) Inventors: Yuji Kyoya, Kanagawa-Ken (JP); Kunio Noguchi, Kanagawa-Ken (JP); Takashi Nakano, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 817 days.

(21) Appl. No.: 10/429,858

(22) Filed: May 6, 2003

(65) Prior Publication Data
US 2003/0210278 A1 Nov. 13, 2003

(30) Foreign Application Priority Data
May 8, 2002 (JP) ............................ 2002-133316

(51) Int. Cl.
*G06F 3/048* (2006.01)
(52) U.S. Cl. ..................................... 715/783
(58) Field of Classification Search ................. 715/788, 715/779, 783, 781, 778
See application file for complete search history.

(56) References Cited

U.S. PATENT DOCUMENTS

| 5,714,971 | A | * | 2/1998 | Shalit et al. ................. 715/804 |
| 5,796,403 | A | * | 8/1998 | Adams et al. ............... 715/803 |
| 6,966,033 | B1 | * | 11/2005 | Gasser et al. ............... 715/738 |
| 2001/0013877 | A1 | * | 8/2001 | Fujino ........................ 345/835 |

FOREIGN PATENT DOCUMENTS

| JP | 11-45197 | 2/1999 |
| JP | 2000-148786 | 5/2000 |
| JP | 2001-147915 | 5/2001 |
| JP | 2001-256480 | 9/2001 |
| JP | 2002-007433 | 1/2002 |

OTHER PUBLICATIONS

Microsoft Windows (copyright 1981-2001).*
Windows Explorer (Microsoft Windows, Version 5.1, Copyright 1981-2001).*
U.S. Appl. No. 10/431,527, filed May 8, 2003, to Kyoya et al.
Kunio Noguchi et al., "Methodology for Planning and Designing New Products Based on the Voice of the Customer", 7th International Symposium on Quality Function Deployment, pp. 1-8, (2001).

(Continued)

*Primary Examiner*—Thanh T Vu
(74) *Attorney, Agent, or Firm*—Finnegan, Henderson, Farabow, Garrett & Dunner, L.L.P.

(57) ABSTRACT

Proposed are a data-organization support method for efficient user-initiative on-screen data classification and a program product for achieving the data-organization support method. A data file, a correction of items to be classified is loaded to display a classification window having a group window and several item (contents-view) windows. An on-screen operation, such as, shifting an item over the item windows initiates item processing such as change in a group to which the item belong. An on-screen operation, such as, shifting a group in the group window initiates group processing such as displaying the contents of the group or change in group hierarchy. The results of classification are reflected on the group window and stored as a classification history.

17 Claims, 16 Drawing Sheets

OTHER PUBLICATIONS

Japanese Office Action mailed Jun. 26, 2007 from the Japanese Patent Office for corresponding Japanese Patent Application No. 2003-130492.

Notification of Reason for Rejection issued by the Japanese Patent Office on Oct. 9, 2007, for Japanese Patent Application No. 2003-130492, and English-language translation thereof.

Hasegawa, H.; Finally Appeared Whole Aspect of Win3.1J: Japanese-Language Version Windows 3.1, I/O, Japan, Kohgaku-Sha Co., Ltd., May 1, 1993, vol. 18, No. 5, pp. 29-37.

Notification of Reason for Rejection mailed Jan. 18, 2008 from the Japanese Patent Office for a counterpart Japanese Patent Application No. 2003-130492.

* cited by examiner

| | 1 | 2 | 3 | 4 | 5 | 6 |
|---|---|---|---|---|---|---|
| 1 | VoC | ADDITIONAL INFORMATION | OCCUPATION | GENDER | AGE | DATE OF VOC |
| 2 | WINDOW IS COMPLICATED TO OPERATE... | OLD EMPLOYEE WORKING FOR A UNIVERSITY... | CLERK | MALE | 60S | 2000/3/4 |
| 3 | ATM PROVIDED PER BANK IS... | RECENTLY TRANSFERRED | TEACHER | MALE | 40S | 2000/3/4 |
| 4 | ... | ... | ... | ... | ... | ... |
| 5 | ... | ... | ... | ... | ... | ... |
| 6 | ... | ... | ... | ... | ... | ... |
| 7 | ... | ... | ... | ... | ... | ... |
| 8 | ... | ... | ... | ... | ... | ... |
| 9 | ... | ... | ... | ... | ... | ... |
| 10 | ... | ... | ... | ... | ... | ... |

1ST ROW : VOC

FROM 2ND ROW : ATTRIBUTE PER VOC

DATA ORGANIZATION SUPPORT METHOD AND PROGRAM PRODUCT THEREFOR

CROSS REFERENCE TO RELATED APPLICATIONS

This application is based upon and claims the benefit of priority from the prior Japanese Patent Application No. 2002-133316 filed on May 8, 2002 in Japan, the entire contents of which are incorporated by reference.

BACKGROUND OF THE INVENTION

1. Field of Art

The present invention relates to a computer-aided data-organization support method for classifying a large number of data into groups and a program product for achieving the data-organization support method.

2. Related Art

A known tool for classifying a large number of data on computer screen is GUI, such as, Windows Explorer (registered trademark), a file-handling software running under the Microsoft operating system Windows (registered trademark).

Windows Explorer offers two left and right windows. Displayed on the left window is a tree-like hierarchical folder structure. Displayed on the right window are subfolders, files, etc., belonging to a folder appointed in the left window.

Windows Explorer has high operability in changing the hierarchical folder structure and folders to which files belong, with drag-and-drop operations to icons and character strings that express folders, files, etc., displayed on the left and right windows.

The known data-organization tool has high operability in displaying the hierarchical folder structure simultaneously with the contents of any folder.

Nevertheless, it is required that the folder, the contents of which are being displayed, be closed before displaying the contents of another appointed folder. This forces a user to open the two folders one by one for confirming the contents in file transfer between the folders.

File transfer among three or more of folders requires complicated operations and causes troubles to the user in confirmation of the contents of all folders, thus drastically lowering operating efficiency.

Not only in folder/file classification, these problems could also occur, in general, in classification of a large number of data on screen.

In addition to file transfer, the known GUIs, such as, Windows Explorer, are not feasible tools, particularly, for organization of ideas and information, etc., in which the contents of several number of groups (folders) are to be simultaneously displayed.

SUMMARY OF THE INVENTION

In view of these problems, a purpose of the present invention is to provide a computer-aided data-organization support method for efficient user-initiative on-screen data classification and a program product for achieving the data-organization support method.

In order to fulfill the purpose, the present invention achieves user-initiative efficient classification that offers users user-friendly on-screen operations on and allows them to check the contents of several groups displayed over several contents-view windows.

Several important terms used in this specification are defined as follows:

The term "data" or "information" is widely interpreted. It includes a variety of types of information, for example, data unit such as file, sentence, character string, figure, symbol and mark.

The term "group" may be interpreted as a set of one or more of data or information to be classified. The term "element" may be interpreted as each of several elements constituting a group.

The term "element-indicating image" may be interpreted as an image expressing an element on a computer screen. In detail, the element-indicating image is displayed as a character string, an icon, a figure, a symbol, etc., indicating an element name. In addition, it may be an image expressing data (or information) when an element is data itself to be classified. The image that expresses data or information itself may be a sentence, a character string, a figure, a symbol, a mark, etc.

The term "group-indicating image" may be widely interpreted as an image expressing a group on a computer screen. It includes a variety of types of image such as a character string, an icon, a figure, a symbol, etc.

The term "group hierarchy" may be interpreted as a hierarchy of several groups. It is usually displayed as a tree structure. However, it may be displayed in any forms in accordance with the location to be displayed, size, color, etc. Or, a symbol or mark may be added to the group hierarchy.

The term "result of data classification" may be widely interpreted as a result of procedure of classifying data or information. The result of data classification includes not only a final result on completion of data classification but also a result of each classification-procedure step.

A data-organization support method according to a first aspect of the present invention is a computer-aided data-organization support method for classifying data into a plurality of groups comprising: displaying a plurality of contents-view windows on a computer screen by using element-indicating images each expressing one of a plurality of elements constituting each group, the windows being capable of displaying a list of elements of each group; classifying the data on the computer screen, the data-classifying step further deciding a group to which the elements belong when an element-indicating image selected from the list of elements displayed on one of the contents-view windows is shifted; and storing at least one result of the data classification.

A second aspect of the present invention is a computer-readable program product for executing classification of data into a plurality of groups comprising: a function of displaying a plurality of contents-view windows on a computer screen by using element-indicating images each expressing one of a plurality of elements constituting each group, the windows being capable of displaying a list of elements for each group; a function of classifying data on the computer screen in response to on-screen operations, the data-classifying function further deciding a group to which the elements belong when an element-indicating image selected from the list of elements displayed on one of the contents-view windows is shifted; and a function of storing at least one result of the data classification.

BRIEF DESCRIPTION OF DRAWINGS

FIG. 2 is an illustration of a data file under the data-organization support procedure shown in FIG. 1;

FIG. 9 is an illustration of a table screen displayed on completion of the data-organization support procedure shown in FIG. 1;

FIG. 13 is an illustration of on-screen operations in change of the number of item windows;

DETAILED DESCRIPTION OF EMBODIMENT

An embodiment according to the present invention will be disclosed with reference to the attached drawings, although showing one aspect of the invention.

The present invention is achieved, for example, with software running on computer. The software controls the computer hardware to achieve the invention, known techniques being partly used if feasible.

The type and architecture of hardware and software and also the range of targets to be processed by the software to achieve the invention are modifiable.

A software program disclosed later is one form of the present invention.

1. Outline of Data-Organization Support Procedure

Figure 1:
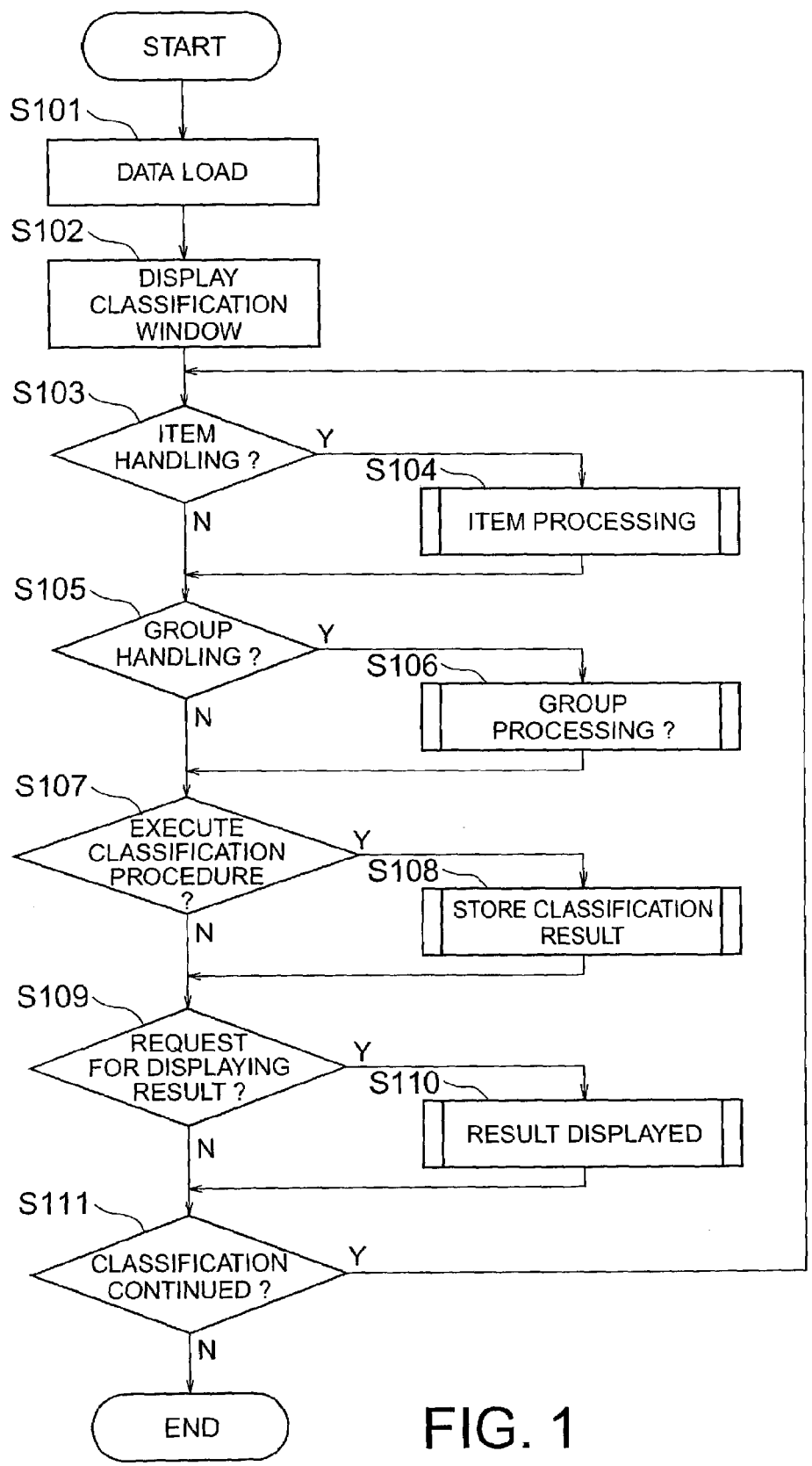
FIG. 1 is a flowchart showing an outline data-organization support procedure according to an embodiment of the present invention.

FIG. 1 is a flowchart showing an outline data-organization support procedure according to the present invention.

Disclosed here is hierarchical grouping of ideas expressed in sentence, like a KJ-method or an affinity-diagram method. One idea expressed in sentence is handled as one item.

Each group-indicating image indicating a group on screen is composed of a character string expressing the group name. Each element-indicating image indicating an element on screen is composed of a character string expressing an item that is an element of a group or a character string expressing the name of a subgroup belonging to the group.

A character string expressing a group name and a character string expressing an item are called just a group and an item, respectively, hereinafter for brevity, with exception that a character string expressing a group name is called a group name when this term focuses on the name of a group, not the group itself.

The data-organization support procedure shown in FIG. 1 is disclosed in detail.

On a user operation such as data-file appointments, a data file, a collection of items to be classified, such as shown in FIG. 2, is loaded into a computer work memory area (S101). Displayed on a computer screen is a classification window that includes a group window GW and several item (contents-view) windows IWs (S102). The group window GW displays a group tree indicating a hierarchical group structure, with group names.

Figure 3:
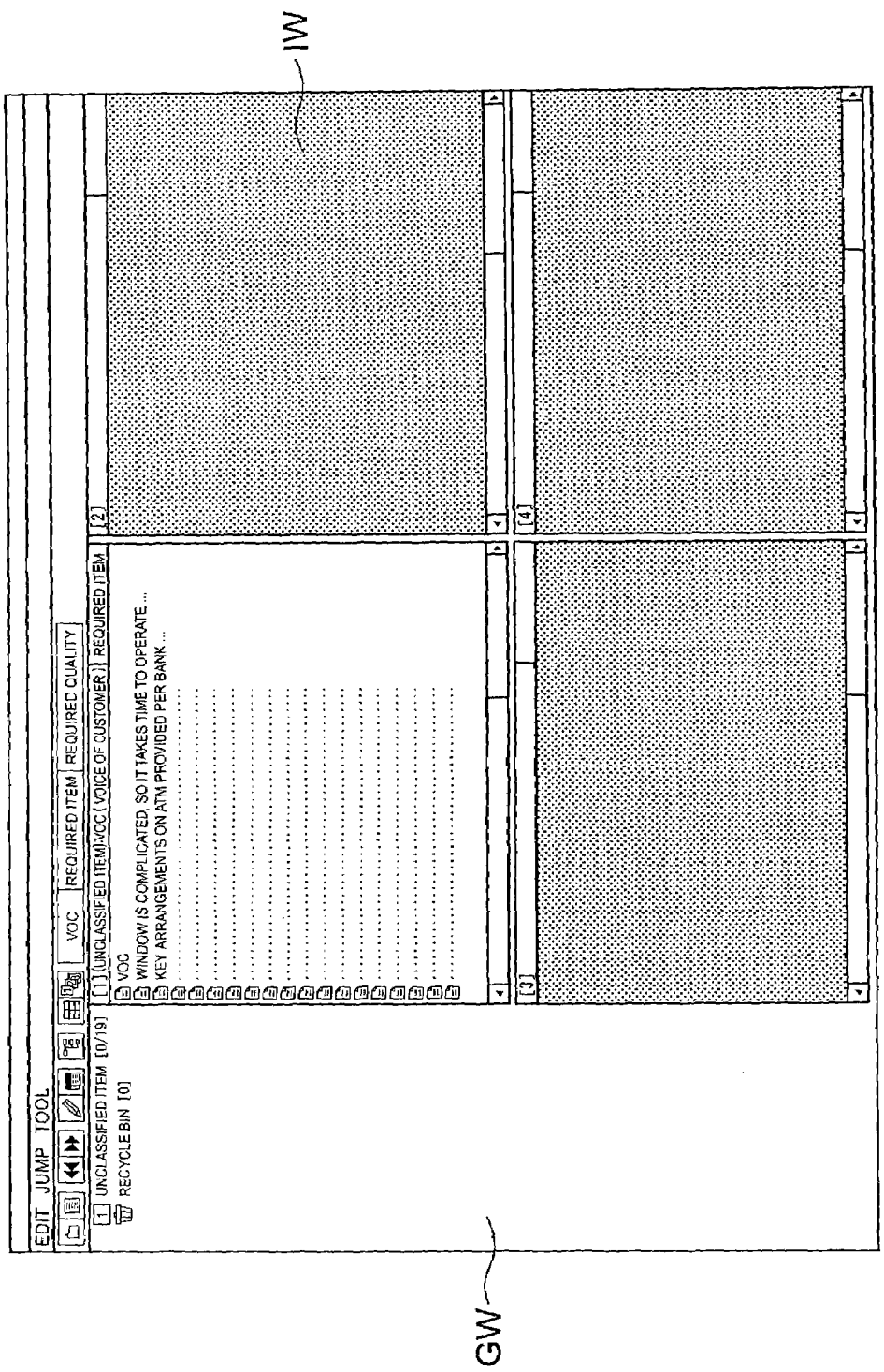
FIG. 3 is an illustration of a classification window used in the data-organization support procedure shown in FIG. 1.

In this embodiment, as shown in FIG. 3, an item window is one of several (four in FIG. 3) windows displayed on the right side of a main screen. Each item window is also called a contents-view window. Further in this embodiment, as shown in FIG. 3, a group window is a single window displayed on the left side of the main screen. The group window displays a group tree.

For plain explanation of terms, a contents-displaying state of an item window is called that a group is "open" or "opened". In detail, an item window displays a list of group elements in the contents-displaying state. When the display is brought into a halt, or an item window is in a contents-closing state, it is called that a group is "closed".

Moreover, when an item window is displaying the contents of a group, it is called that the item window is opened or being opened whereas when it is not displaying the contents of a group, it is called that the item window is closed or being closed.

An item classification procedure is performed in accordance with a user operation on the classification window shown in FIG. 3, to reflect the user operation on data.

In detail, when a user performs an operation such as a shift operation to any item or subgroup displayed in any of the item windows IW of the classification window (YES in S103), a classification procedure (item processing) is executed such as changes in group to which the item or subgroup belongs (S104).

More in detail, when the user shifts an item belonging to a group displayed on an item window IW to another group displayed on another opened item window IW, a data processing is executed to change the group to which the item has belonged to the new group.

In contrast, when the user shifts an item belonging to a group displayed on an item window IW to another group displayed on another closed item window IW, a data processing is executed to create a new group in the closed item window IW and change the group to which the item has belonged to the new group. The newly created group is temporarily given the name composed of the entire character string that constitutes the item.

When the user performs an operation such as a shift operation to any group displayed on the group window GW of the classification window (YES in step S105), a classification procedure (group processing) is executed to display the contents of the group, modification to the group hierarchy, etc., (S106).

In detail, when the user double-clicks a group in a group tree displayed on the group window GW, the group is "opened" in a closed item window IW. It is "closed" when the user stops group appointments.

When the user shifts a group in a group tree displayed on the group window GW, a data processing is executed to modify the group hierarchy so that the group belongs to a new hierarchy level.

Next, when a user-desired classification procedure is executed (YES in step S107), the results of classification are reflected on the classification window and then stored in a classification history (step S108).

For example, when a new group is created by an item processing on an item window IW, the new group is displayed on the group window GW and data modified in accordance with the creation of new group is stored.

The stored results of classification can be retrieved and used during this classification procedure or a further classification procedure to other work data.

Next, when the user requests that the results of classification be displayed, via an operation menu or an icon displayed on the classification window (YES in step S109), a result-view window is displayed in a specific format different from the classification window based on the stored results of classification (S110).

If the user wants to continue the classification procedure (YES in S111), the sequential steps S103 to S111 are repeated while the classification window is opened.

The data-organization support procedure ends when the user checks the displayed results and stops the classification procedure (NO in step S111).

2. Basic Function of Data-Organization Support Procedure

The data-organization support procedure disclosed above offers a user-friendly KJ-method-like grouping function with mouse clicking operations, as described below.

Firstly, the user appoints a data file on a start-up window, etc. The data file is a collection of items having attributes such as shown in FIG. 2. The items are loaded to display a classification window such as shown in FIG. 3. All of the loaded items belong to a group in UNCLASSIFIED ITEM in FIG. 3. The items are also displayed on a first item window IW1 among four (2×2)-item windows IW1 to IW4.

The user can group the total number "n" of the items belonging to a group in UNCLASSIFIED ITEM according to their meanings or definitions, as described below.

The first operation for the user is to select an item I1 among items belonging to a group G0 in UNCLASSIFIED ITEM displayed on the first item window IW1. He or she then drags the item I1 and drops it into the closed second item window IW2.

These operations create a new group G1 in the second item window IW2, so that the item I1 is shifted to the group G1. Displayed on the second item window IW2 is the entire character string that constitutes the item I1 as a temporal group name of the group G1. The temporal group name is also displayed on the group window GW.

Therefore, the user can confirm that the new group G1 has been created and then the item I1 has been classified into the group G1, on the second item window IW2 and the group window GW. The displayed temporal group name can be changed according to needs.

Next, the user selects another item I2 among the items belonging to the group G0 in UNCLASSIFIED ITEM and compares the item I2 with items already grouped, to perform a shift operation based on the comparison (comparison and shifting operation) for the grouping procedure to the item I2.

In detail, the user compares the item I2 with the item I1 already shifted to the group G1 to determine whether the former is close to the latter in definition or meaning.

On determination that the former is close to the latter, the user drags the item I2 and drops it into the group G1 to which the item I1 belongs, to shift it to the group G1.

In contrast, on determination that the former is not close to the latter, the user drags the item I2 and drops it into the closed third item window IW3, so that a new group G2 is created in the window IW3 and hence the item I1 is sifted to the group G2. Also displayed on the third item window IW3 and the group window GW is a temporal group name given to the group G2.

The user selects new items one by one among the items belonging to the group G0 in UNCLASSIFIED ITEM and repeats the comparison and shifting operation disclosed above.

If all item windows are opened at the time of creating new groups, the user double-clicks groups of low importance at present to "close" them, to reserve the item windows IW for creation of new groups.

Figure 4:
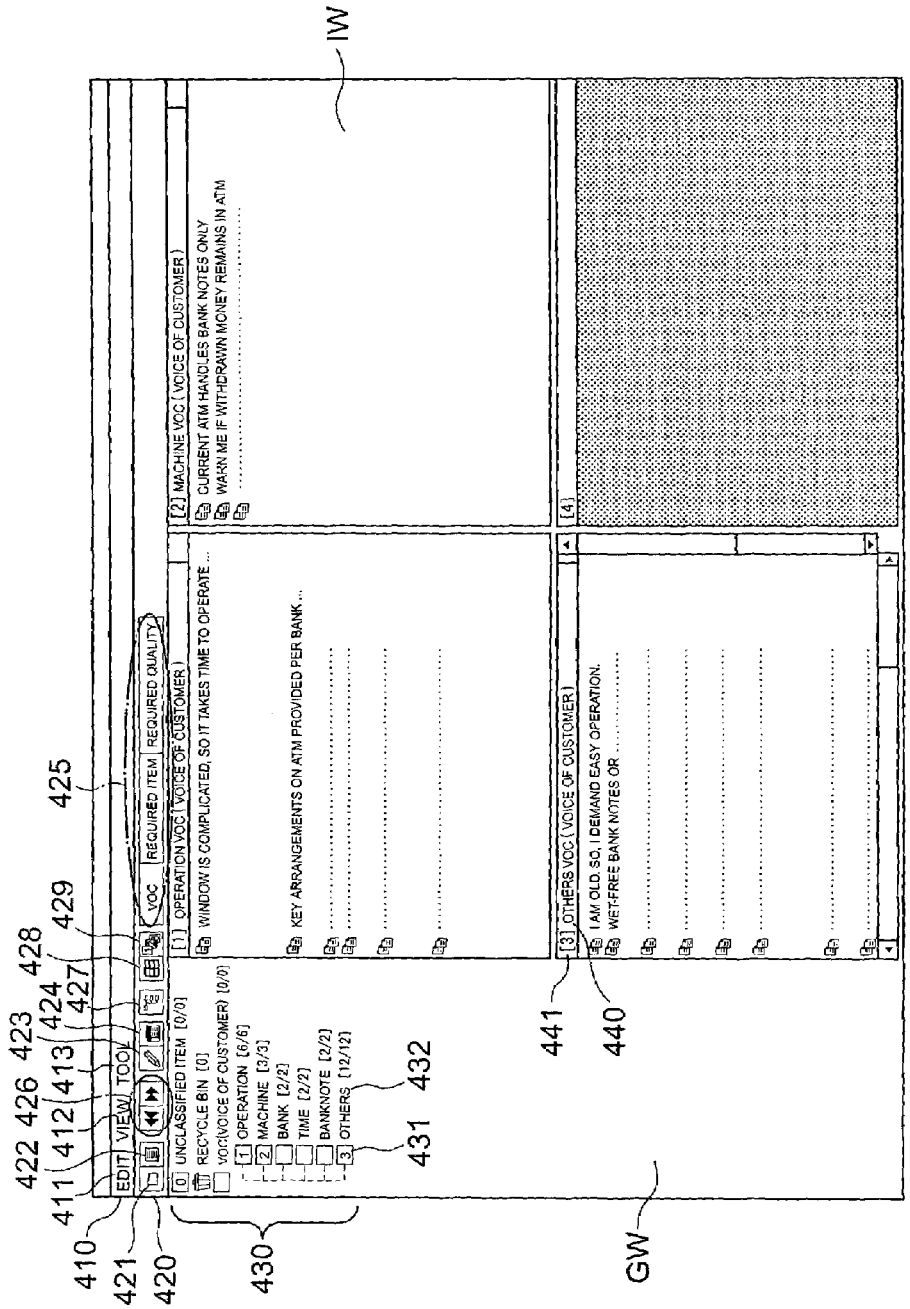
FIG. 4 is an illustration of several windows displayed after classification on the classification window shown in FIG. 3.

Illustrated in FIG. 4 are items of three groups OPERATION, MACHINE and OTHERS displayed on the item windows IW1, IW2 and IW3, respectively, among six groups OPERATION, MACHINE, BANK, TIME, BANKNOTE and OTHERS created on the classification window shown in FIG. 3.

On completion of grouping to all of the "n" number of items in the group G0 in UNCLASSIFIED ITEM, a group tree is constructed in the group window GW.

If the user has determined that an upper-level group can be created from combination of the groups, he or she performs the drag-and-drop operation to the groups in the group tree on the group window GW for grouping.

The grouping can be repeated if the user determines that a further upper-level group can be created, on completion of grouping to the same-level groups.

The sequential procedures disclosed above offer the user-friendly KJ-method-like grouping function. This grouping function under the data-organization support procedure in this embodiment achieves further efficient classification to a large number of items, compared to a known KJ-method-like grouping with on-desk manual and two-dimensional item arrangements.

3. Supplemental Explanation of Classification-Window Format

The following is a supplemental explanation of the classification window with respect to FIG. 4, which has been briefly explained in the disclosure of the data-organization support procedure.

Shown in FIG. 4 at the top of the classification window are a menu bar 410 with EDIT, VIE, etc., and a tool bar 420 for several functions such as "new group creation", "display propertied", etc.

Displayed on the tool bar 420 are a group-creation icon 421 for creation of new groups; a group-property 422 for displaying group properties; a classification-window icon 423 for displaying the classification window; a result-view window icon 424 for showing the results of operations; a hierarchy-appointment icon 425 for displaying all groups at the same level of hierarchy; a hierarchy-level switching icon 426 for displaying all groups at a level upper or lower than the level now highlighted in hierarchy; a tree-diagram screen icon 427 for displaying a tree-diagram screen; a contents-view-window-number changing icon 428 for changing the number of contents-view windows; and a contents-view-window rearrangements icon 429 for rearranging groups displayed on a contents-view window.

A group tree 430 displayed on the group window GW consists of icons 431 and group names 432.

Provided above each of the item windows IW1 to IW4 is a group-name view zone 440 for displaying the name of an "opened" group. Attached to each group-name view zone 440 is a window-number zone 441 such as "1" to "4" for the item windows IW1 to IW4, respectively. When a group is "open", the window number "1", "2", "3" or "4" of the item window in which the group is "open" is displayed on an icon 431 corresponding to the group.

4. Details of On-Screen Classification Procedure

The data-organization support procedure in this embodiment offers several item windows for displaying items in on-screen item and/or group handling for efficient classification procedure, thus taking peculiar steps.

Figure 5:
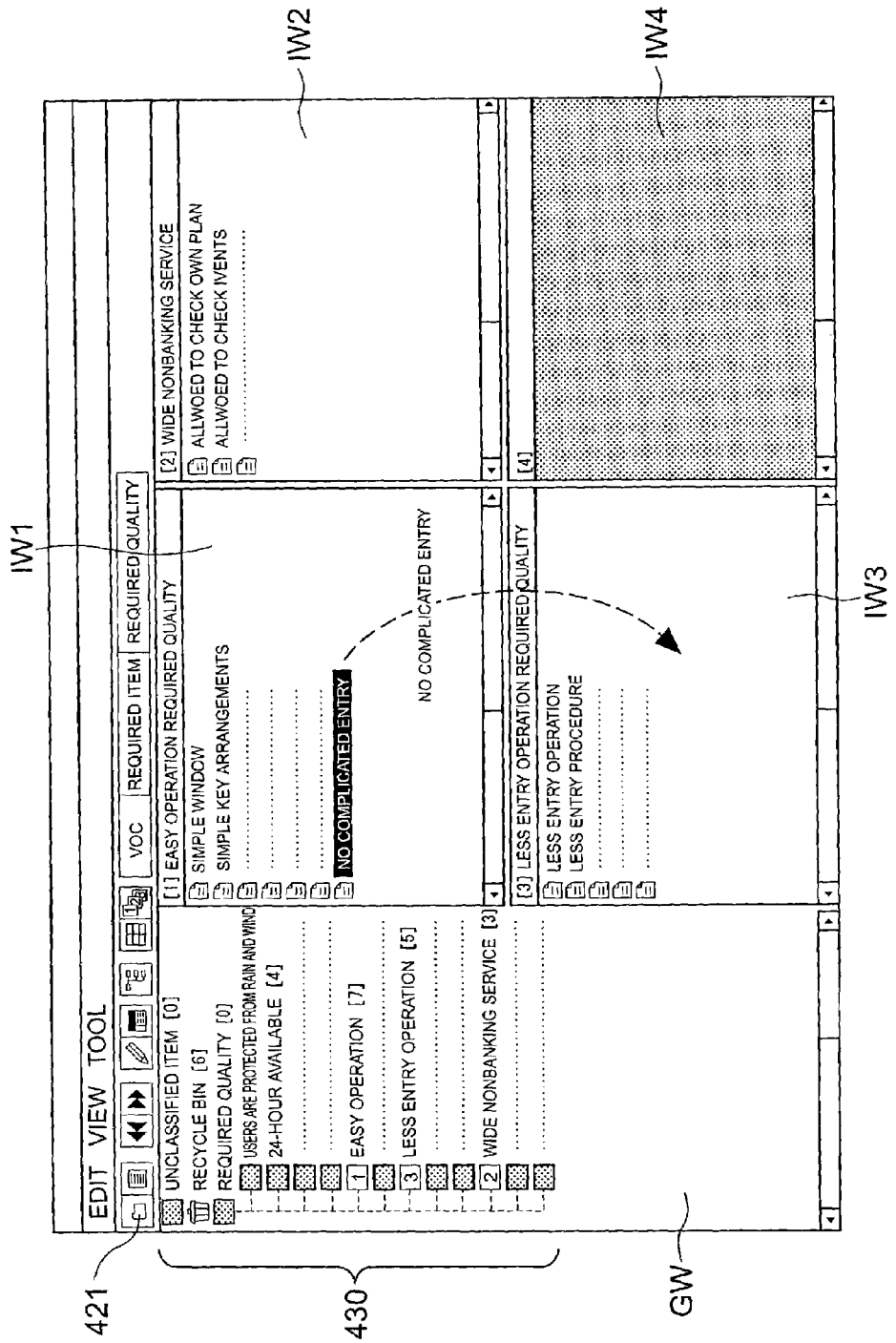
FIG. 5 is an illustration of item handlings on item windows in the classification window shown in FIG. 4.
Figure 6A:
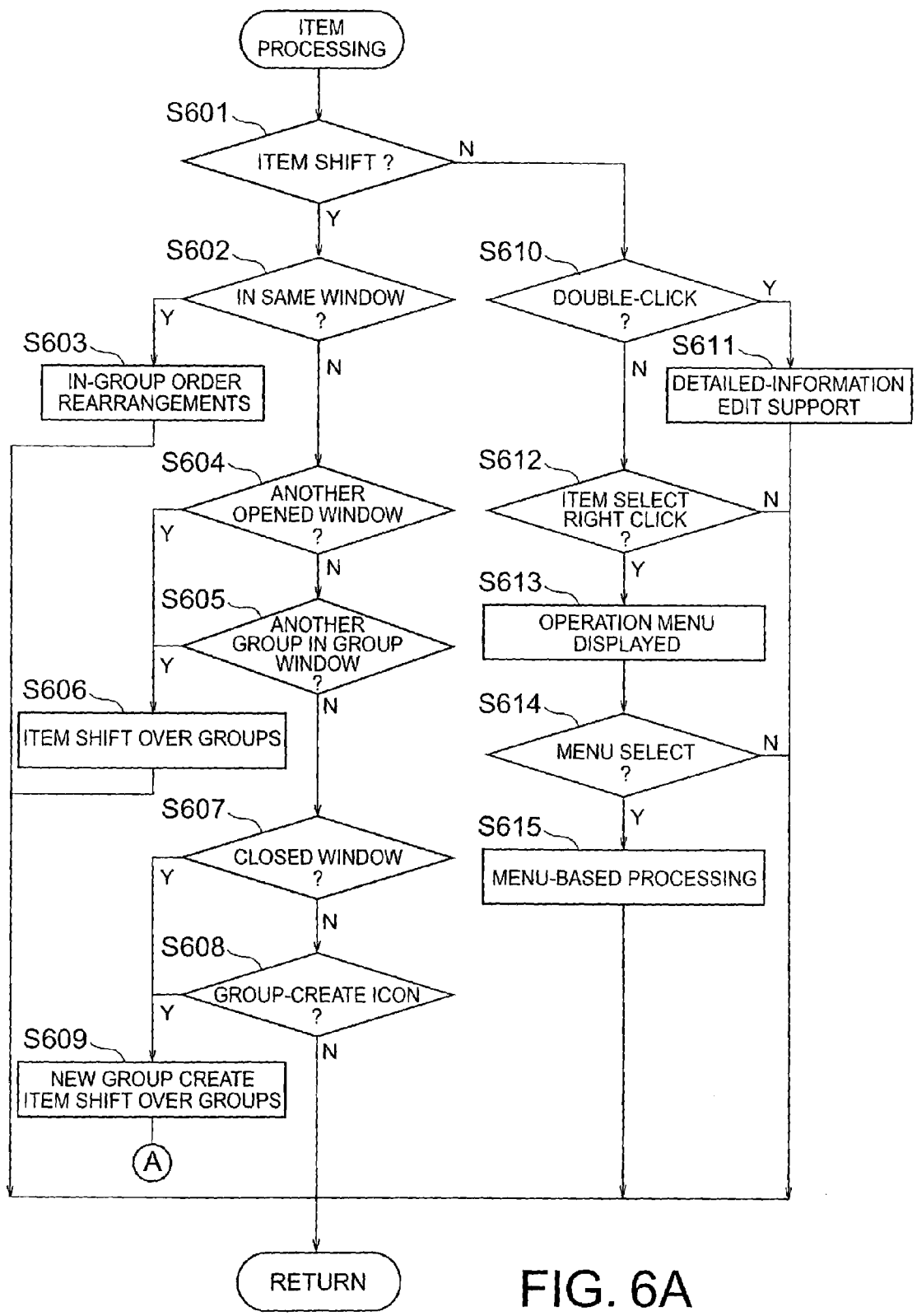
FIGS. 6A and 6B are flowcharts showing an item-processing subroutine in the data-organization support procedure in FIG. 1.
Figure 6B:
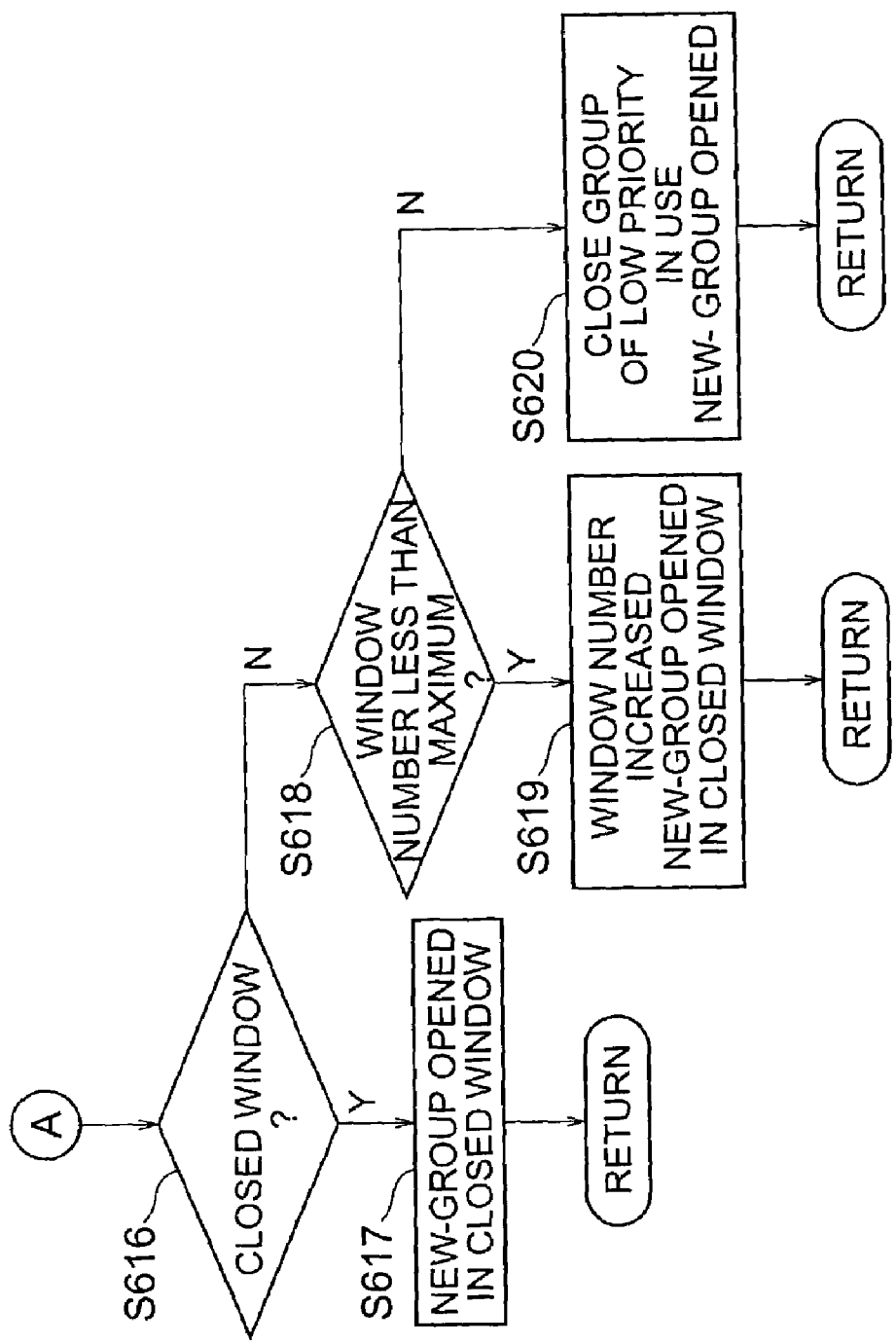

FIG. 5 shows a classification window similar to that in FIG. 4, illustrating item handling on item windows. FIGS. 6A and 6B are flowcharts indicating an on-screen item processing sequence that can be used as a subroutine for the item processing (S104) in the data-organization support procedure shown in FIG. 1.

Disclosed below in detail with reference to FIGS. 5, 6A and 6B are item handling on item windows and its item processing sequence.

Suppose that the user performs a drag-and-drop operation to one item NO COMPLICATED ENTRY in a group EASY OPERATION displayed in the first item window IW1, for item shifting (YES in S601).

The subsequent procedure depends into which window the item has been dropped.

In-group item-order rearrangements are performed (S603) in accordance with the location of the item in the first item window IW1 if it has been shifted in this same window IW1 in which it has existed from the beginning (YES in S602).

In contrast, suppose that the item NO COMPLICATED ENTRY in the first item window IW1 has been shifted to the opened second item window IW2 or third item window IW3 (YES in S604) or any group other than the group EASY OPERATION displayed on the group window GW (YES in S605).

Either case requires that the group to which the item NO COMPLICATED ENTRY belongs be changed to another, in accordance with the location of the shifted item (S606).

For example, if the item NO COMPLICATED ENTRY has been shifted to the second item window IW2, it belongs to a group WIDE NONBANKING SERVICE . . . "opened" in the window IW2.

Moreover, if the item NO COMPLICATED ENTRY has been shifted to a group 24-HOUR AVAILABLE in the group window GW, it belongs to this group.

On the contrary, suppose that the item NO COMPLICAED ENTRY in the first item window IW1 has been shifted to the closed fourth item window IW4 (YES in S607) or the group-creation icon 421 in the tool bar 420 (YES in S608).

Either case requires that the closed fourth item window IW4 be opened to create a new group to which the item NO COMPLICATED ENTRY belongs (S609). The new group is given a temporal group name NO COMPLICATED ENTRY the same as the entire character string of the shifted item. The temporal group name is displayed on the group-name displaying zone 440 and also the group tree 430 in the group window GW.

FIG. 5 illustrates the classification window on which the item window IW4 is closed (YES in step S616 in FIG. 6B). Thus, a new group is "opened" in this closed window IW4 (S617 in FIG. 6B).

Figure 11:
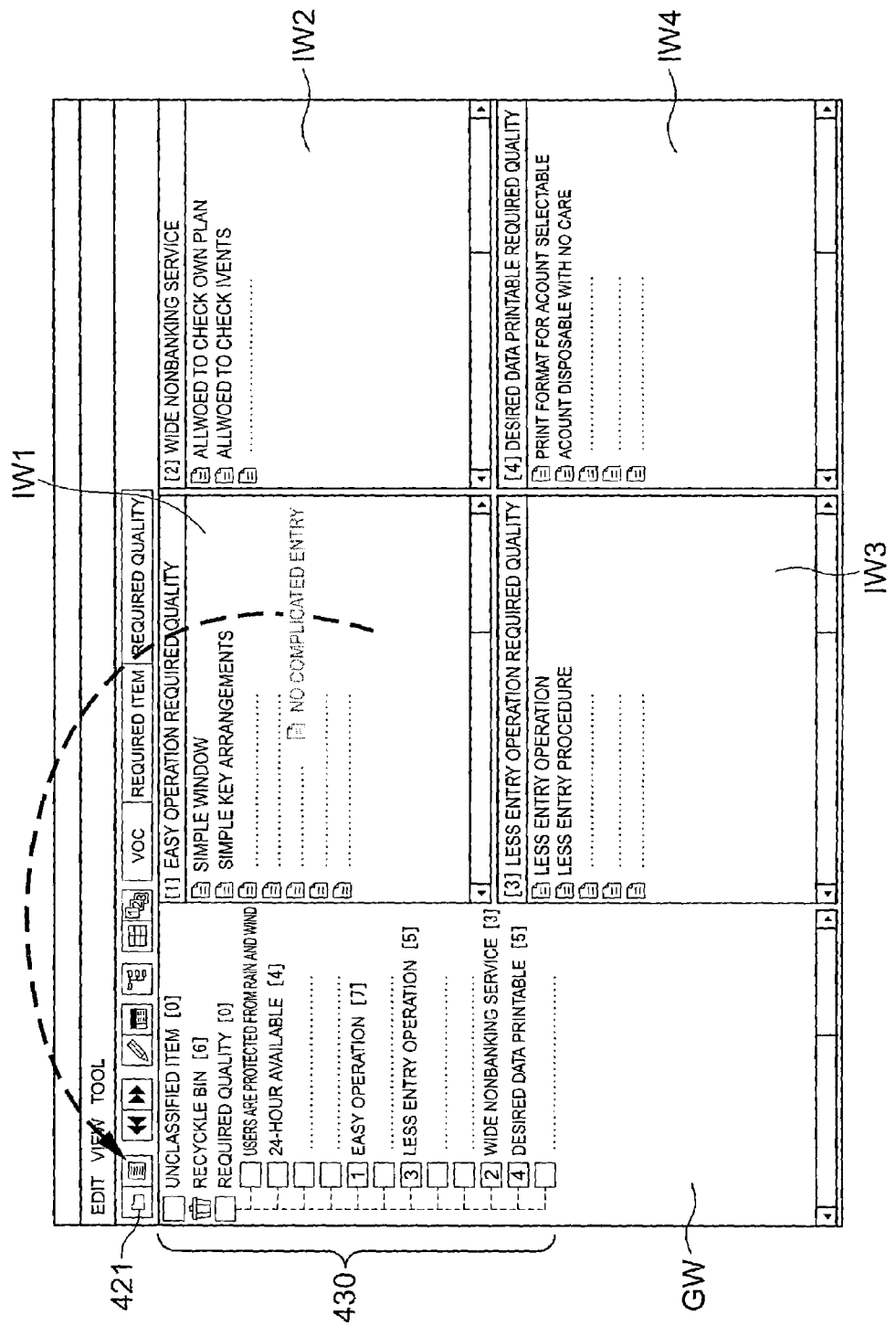
FIG. 11 is an illustration of on-screen operations while no windows are being closed.

In contrast, FIG. 11 illustrates the classification window on which the item window IW4 is opened and a group has been "opened" therein, hence no item windows IW being closed (NO in step S616 in FIG. 6B).

Figure 12:
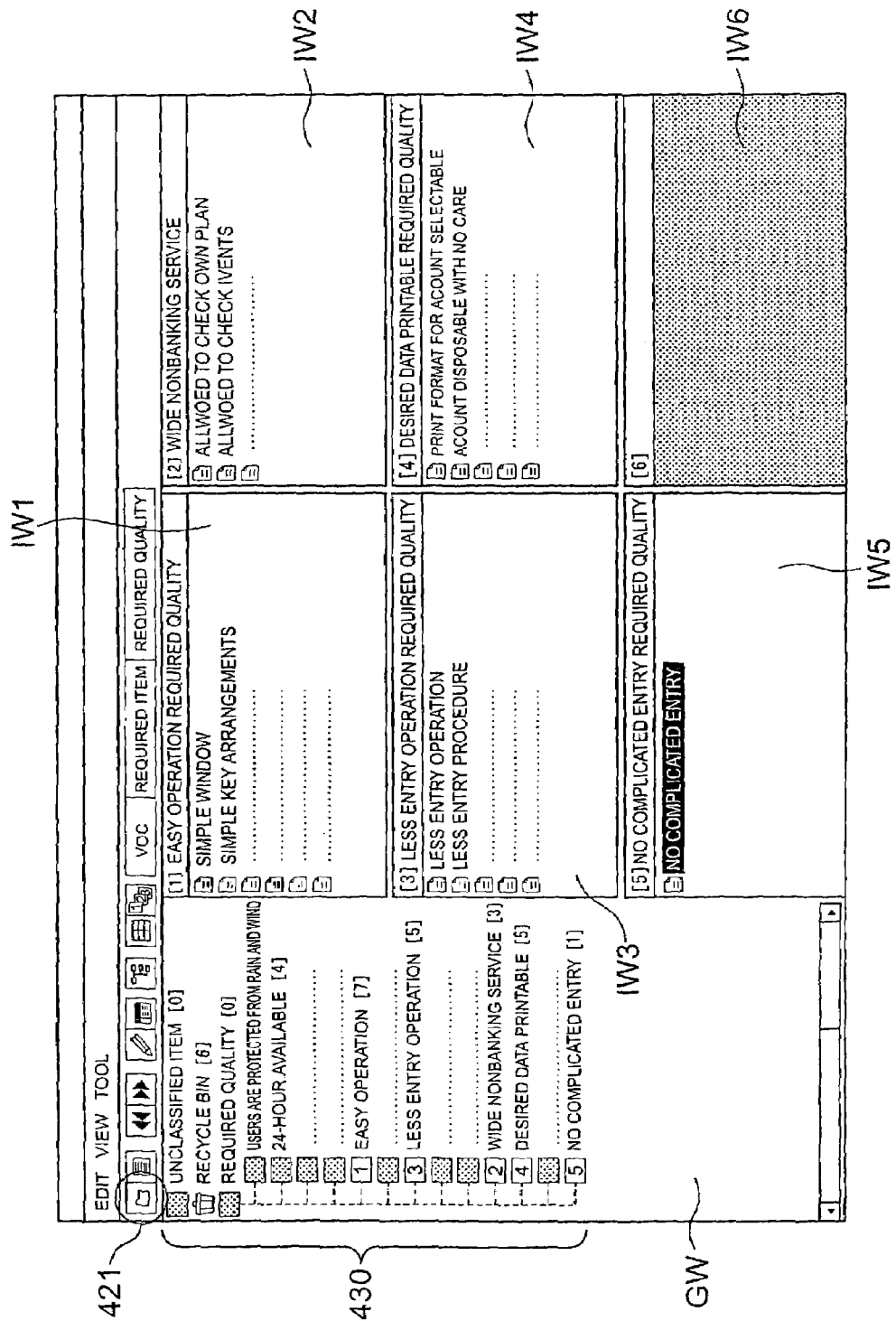
FIG. 12 is an illustration of on-screen operations with addition of rows and columns to item windows on a classification window shown in FIG. 11.

In case of FIG. 11, if the number of item windows IW can be increased (YES in step S618 in FIG. 6B), the rows or columns of item windows IW are increased to provide new item windows, such as, item windows IW5 and IW6 shown in FIG. 12, and a new group is "opened" in the closed item window IW5 (S619 in FIG. 6B).

On the contrary, if the number of item windows IW cannot be increased any more (NO in step S618 in FIG. 6B), an item window IW in which a group of low priority in use is "open" is closed to "close" this group and a new group is "opened" in this closed item window IW (S620 in FIG. 6B).

Different from the above procedure, if the user double-clicks an item on the item window IW1 (NO in S601, YES in S610 in FIG. 6A), a detailed-information window is opened to support the user detailed-information edition (S611).

In contrast, if the user selects an item and presses the right button of a mouse (YES in S612), an operation menu is opened (S613), which includes several commands such as "detailed information", "item delete", "item search" and "property", for processing according to user menu selection (YES in S614, S615).

Figure 7:
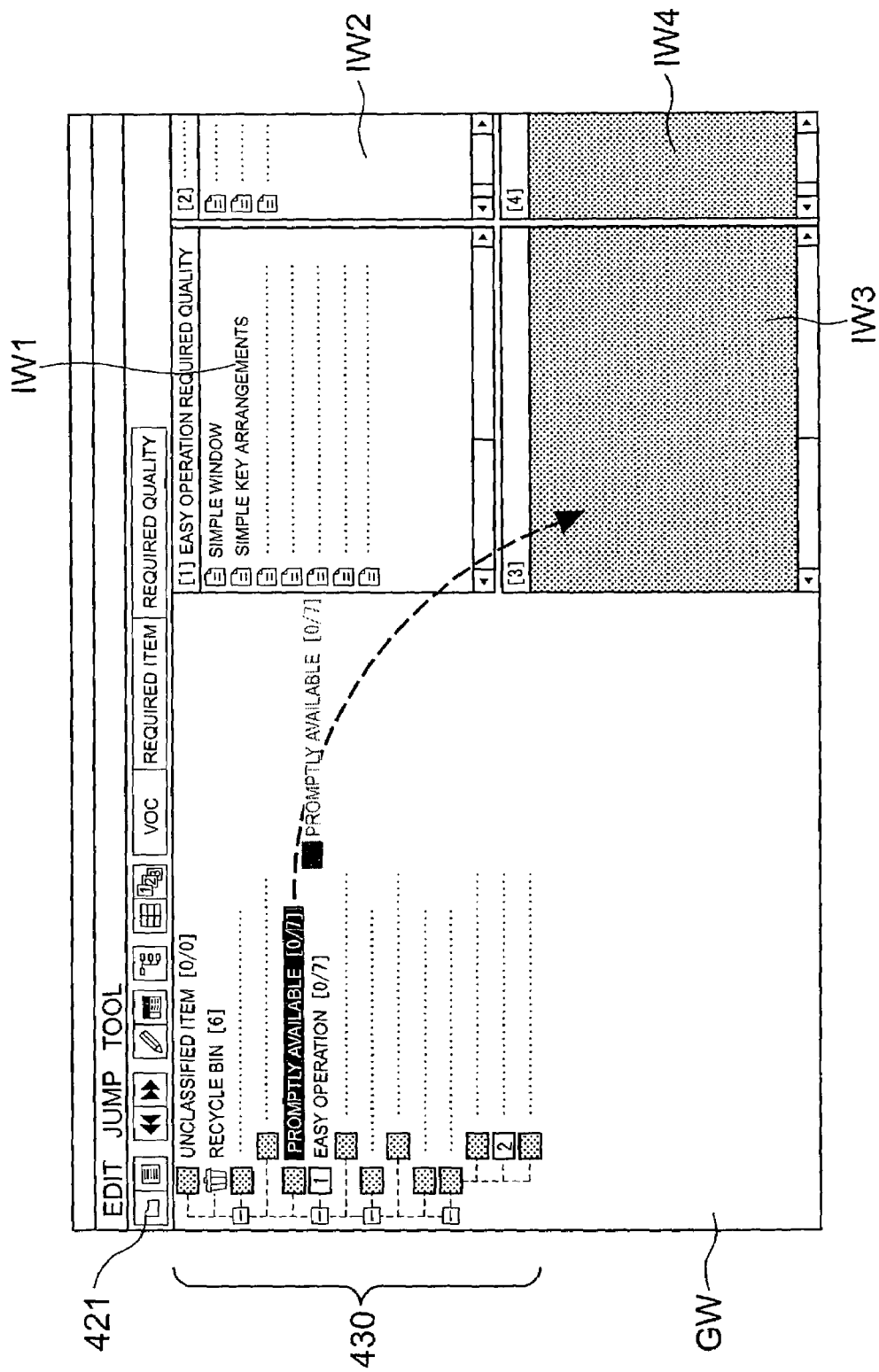
FIG. 7 is an illustration of a grouping procedure on a group window in the classification window shown in FIG. 4.
Figure 8:
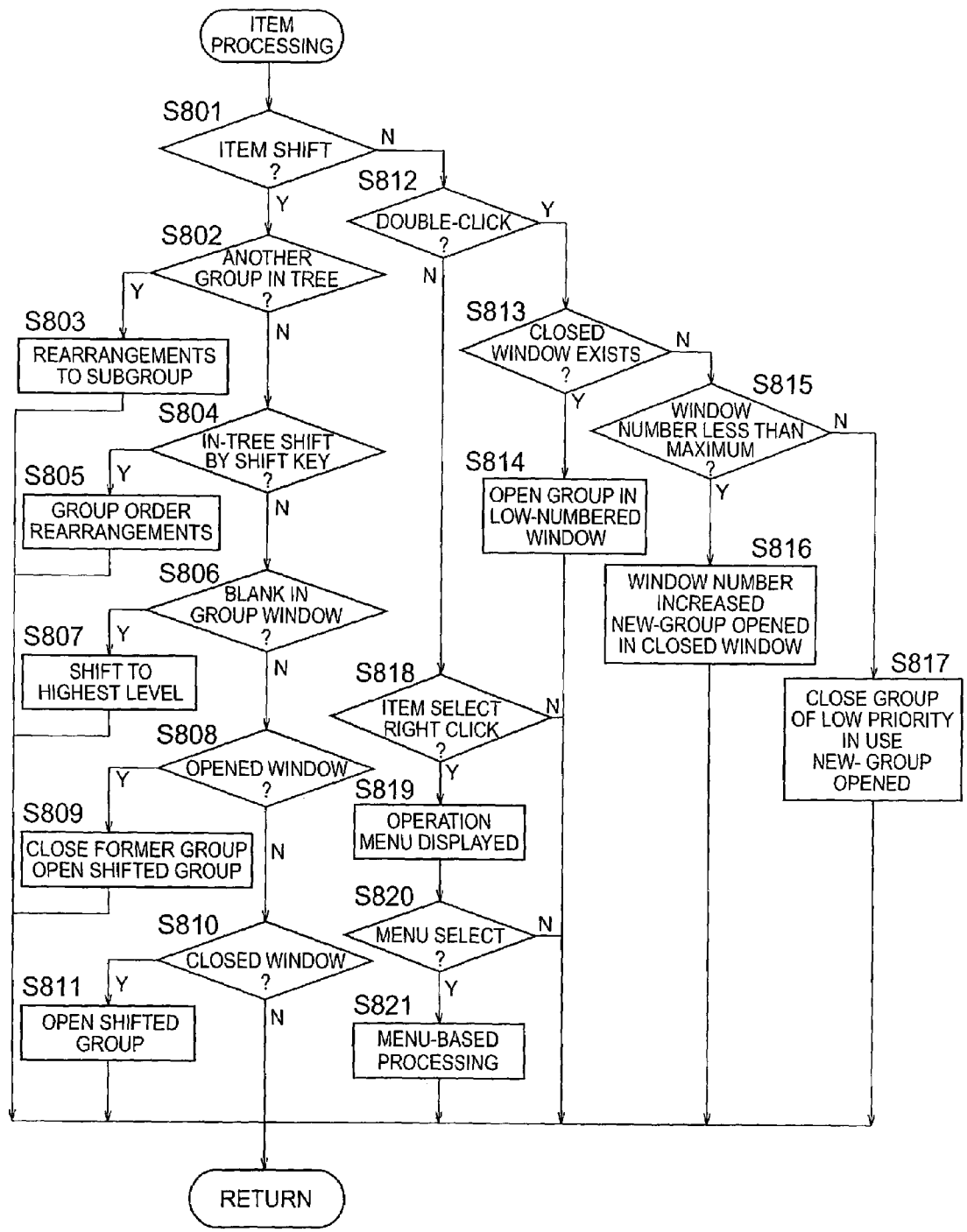
FIG. 8 is a flowchart showing a grouping subroutine in the data-organization support procedure in FIG. 1.

FIG. 7 shows a classification window similar to that in FIGS. 4 and 5, illustrating group handling on a group window. FIG. 8 is a flowchart indicating the on-screen group processing sequence that can be used as a subroutine for the group processing (S106) in the data-organization support procedure shown in FIG. 1.

Disclosed below in detail with reference to FIGS. 7 and 8 are group handling on a group window and its group processing sequence.

Suppose that the user performs a drag-and-drop operation to one "closed" group PROMPTLY AVAILABLE in a group window GW, for group shifting (YES in S801).

The subsequent procedure depends into which window the group has been dropped.

If the group PROMPTLY AVAILABLE has been shifted to another group in the group window GW (YES in S802), the former shifted group is modified as a subgroup of the latter group (S803).

In contrast, if the user drops the group PROMPTLY AVAILABLE into a group tree 430 in the group window GW while pressing a shift key (YES in S804), the order of groups is changed in accordance with the location of the dropped item (S805).

If the destination of the group PROMPTLY AVAILABLE to be shifted is a blank column outside the group tree 430 in the group window GW (YES in S806), this group is moved to the highest level in the tree 430 but in the lowest rank in the highest level (S807).

If the group PROMPTLY AVAILABLE in the group window GW has been shifted to a first item window IW1 in which a group EASY OPERATION is "open" (YES in S808), the group EASY OPERATION is "closed" while the group PROMPTLY AVAILABLE is "opened" (S809).

If the group PROMPTLY AVAILABLE in the group window GW has been shifted to a closed item window IW3 (YES in S810), this group is "opened" in the window IW3 (S811).

Different from the above procedure, suppose that the user double-clicks a group in the group window GW (NO in S801, YES in S812).

If both item windows IW3 and IW4 are "closed" (YES in S813), the double-clicked group is "opened" in the window IW3 given the smaller window number "3" (S814).

In contrast, if no item windows are "closed" (NO in S813), and if the number of item windows IW can be increased (YES in step S815), the rows or columns of item windows IW are increased to provide new item windows, such as, item windows IW5 and IW6 shown in FIG. 12, and a new group is "opened" in the closed item window IW5 (S816).

On the contrary, if the number of item windows IW cannot be increased any more (NO in step S815), an item window IW in which a group of low priority in use is "open" is closed to "close" this group and a new group is "opened" in this closed item window IW (S817).

Contrary to this, if the user selects a group and presses the right button of a mouse (YES in S818), an operation menu is opened (S819), which includes several commands such as "create new subgroup", "group delete", "property" and "classify by attribute" for processing according to user menu selection (YES in S820, S821).

A property window containing group names is opened if the command "property" is selected. The user is allowed to change any group name on the property window.

The on-screen group processing for a group displayed as a subgroup in an item window is basically similar to the item processing shown in FIGS. 6A and 6B, except the following steps.

In detail, a group is displayed on a item window which has been closed when shifted from another item window in which it has been displayed as a subgroup. Moreover, if a subgroup in an item window is doubled-clicked, a group already "opened" in this item window is "closed" and the doubled-clicked subgroup is newly "opened" instead.

One of the features of the data-organization support procedure in this embodiment is that the procedure is automatically switched according to whether items or groups are subjected to the drag-and-drop operation.

In detail, an item is shifted if this single item is subjected to the drag-and-drop operation. In contrast, a group of items is shifted if several items are subjected to the drag-and-drop operation. A new group is created in an opened item window if the single item or the group of items is dropped into this window.

On the contrary, a group is "opened" if this single group is subjected to the drag-and-drop operation. In contrast, several groups are shifted if these groups are subjected to the drag-and-drop operation. A new group is created in an opened item window if the several groups are dropped into this window.

Moreover, a group(s) is (are) shifted if a combination of an item(s) and the group(s) is subjected to the drag-and-drop operation. Nevertheless, this operation can be determined as an error which may otherwise cause troubles to the user due to difference in operations between the single group and the item/group combination.

As disclosed above, the data-organization support procedure in this embodiment achieves the user-friendly KJ-method-like grouping function with double-click and drag-and-drop operations only thanks to automatic procedure switching according to what is subjected to drag-and-drop operation.

5. Outline of Operation Menu

Not only the on-screen item/group shifting disclosed above, the data-organization support procedure in this embodiment offers several on-screen operations, as disclosed below, with the operation menu displayed as icons on the menu bar 410 in the classification window shown in FIG. 4.

An edit icon 411 on the menu bar 410 displays several commands such as "operate item window" and "operate group window". A further detailed operation menu is displayed when the corresponding command is selected. Further selection of commands on the displayed operation menu initiates processing similar to the item/group shifting disclosed above and other processing.

Commands listed in the operation menu on the group window are such as "classify by attribute" like the operation menu for the group processing disclosed above.

A display icon 412 on the menu bar 410 displays several commands such as "display upper level", "display lower level", "display table screen" and "display tree-diagram window".

A tool icon 413 on the menu bar 410 displays several tools such as "execute external application", "configuration settings", "delete duplicate data" and "file merge". Selection of these tools initiates the corresponding processing.

The tool "execute external application" allows the user to select external commands such as "classify by key word" for classification according to user-specified key words.

The tool "configuration settings" allows executable-configuration setups to the user, including tools such as "the number of item windows" that allows the user to set the number of item windows.

The tool "delete duplicate data" allows the user to delete duplicates of item according to user-specified delete requirements.

The tool "file merge" is to load data in an opened file into another file for the user to determine whether to delete all duplicates of item at once.

6. Several Types of Processing

In addition to the on-screen item/group shifting disclosed above, the data-organization support procedure in this embodiment offers several types of processing according to user operations on the menu bar 410, the tool bar 420, etc.

[6-1. Change in the Number of Item Windows]

The number of item windows on the classification window shown in FIG. 4 can be changed within a predetermined range with row/column-number settings. For example, settings for the number of row in the range from 1 to 4 and column in the range from 1 to 6 allow changing the number of the item windows IW in the range from 1 to 24.

As shown in FIG. 4, the four item windows IW with two rows and two columns displayed at the initial settings could not display the contents of all groups if the number of groups is larger than four.

Figure 13:
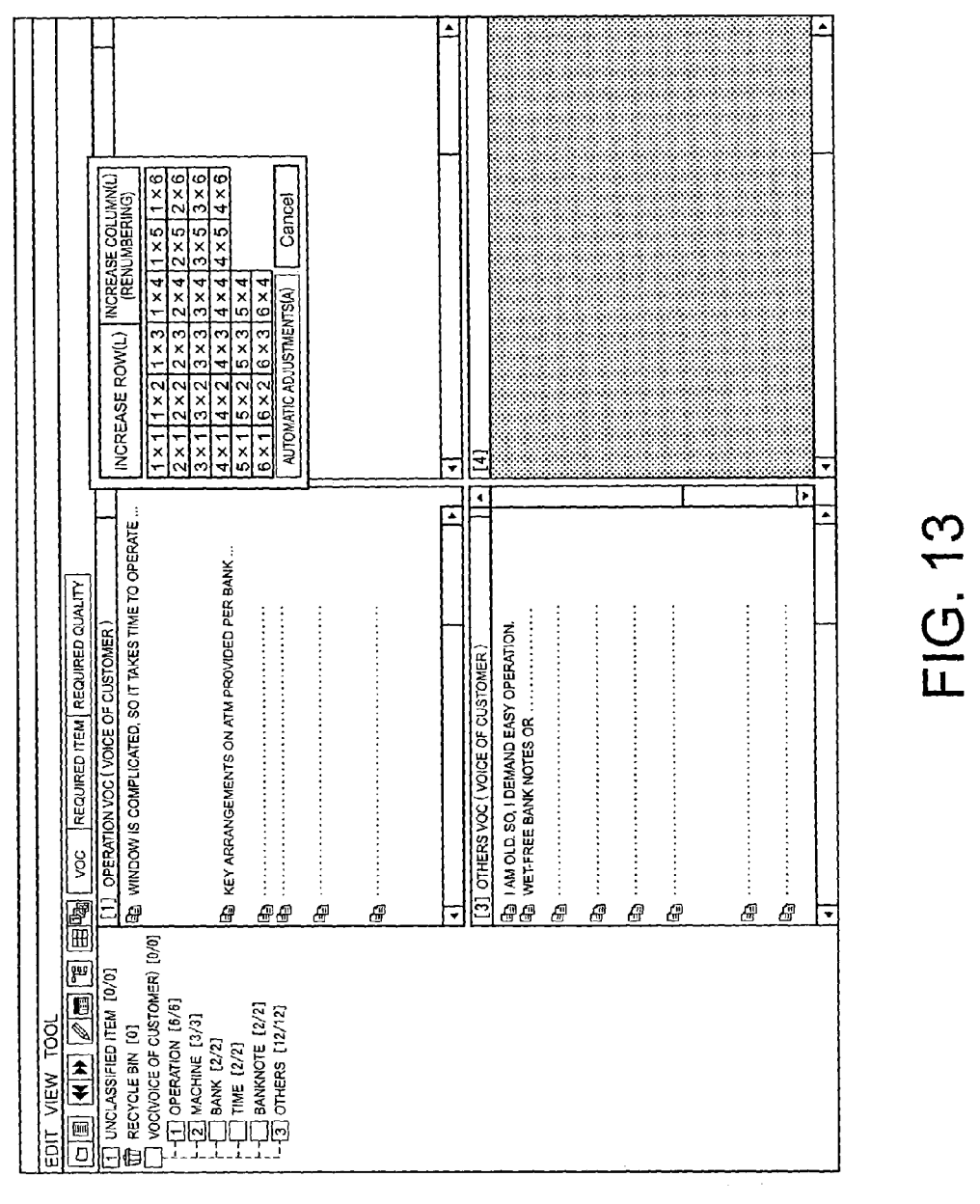

Under this situation, the user is allowed to press the contents-view-window-number changing icon 428 to display a classification window such as shown in FIG. 13.

Depressing a "3×3" button on this classification window changes the number of item windows IW on the classification window to nine (3 in row, 3 in column).

In contrast, depressing a "increase in row" button increases the number of row by one on this classification window, instead of specifying the number of row and column. Displayed in FIG. 12 are six (3 in row, 2 in column) item windows IW by depressing the "increase in row" button.

Accordingly, the user is allowed to increase the number of item windows IW without counting the number of row and column. In the same way, the user is allowed to increase the number of column by depressing a "increase in column" button.

As disclosed above, the user is allowed to change the number of the item windows any time during the classification procedure.

Moreover, when the user wants to scale up the size of each window while reducing the number of groups to be displayed, it is allowed to reduce the number of rows and columns, thus reducing the number of item windows.

Figure 14:
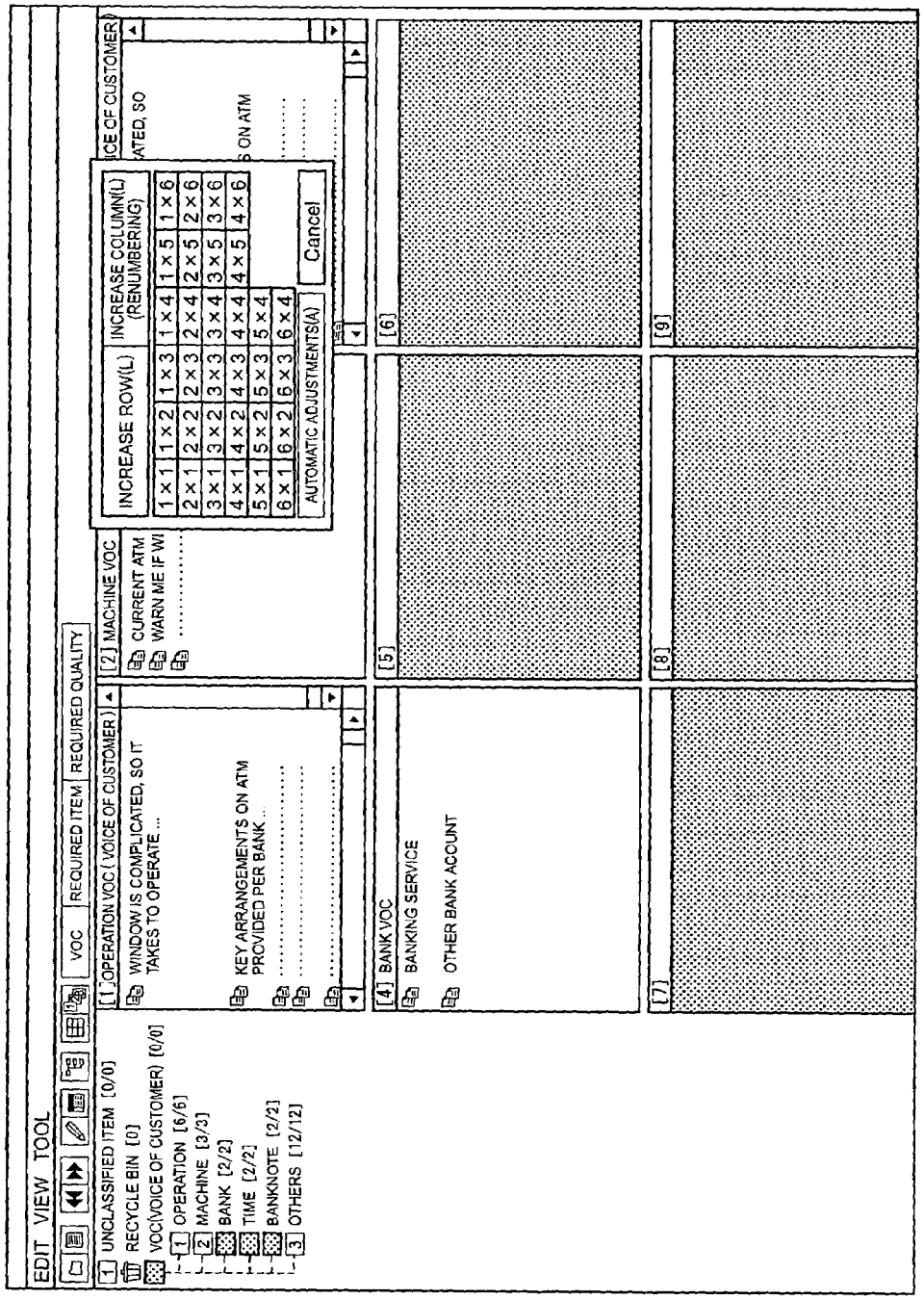
FIG. 14 is an illustration of on-screen operations in change of the number of item windows.

Illustrated in FIG. 14 is the classification window displayed when the contents-view-window-number changing icon 428 is depressed, like shown in FIG. 13. Four item windows IW are only opened although there are nine item windows IW in total.

The user is then allowed to depress a "automatic adjustments" button to decrease the total number of item windows IW to four that corresponds the number of item windows IW opened at present, to display the item windows IW again. The displayed item windows IW are scaled up to an easily-viewable size. The number of row and column for the item windows IW may be decreased to the same or similar number to achieve the easily-viewable size. For example, change in the number to two in row and two in column offers item windows IW of four in total.

Irrespective of the number of item windows, like usual windows, the size of each item window in the classification window and also the total size of all item windows can be scaled up or down. Thus, the user can change the window size by dragging on window frames according to user operation requirements, such as, to scale up the size of one or more of item windows or scale up the item windows larger than the group window or vice versa.

[6.2 Batch Processing Support Procedure]

The data-organization support procedure in this embodiment further supports batch item/group processing.

In detail, when the user appoints a certain level of hierarchy, with the hierarchy-appointment icon 425 or the hierarchy-level switching icon 426, all groups at the appointed level are displayed on the item windows IW at the same time.

Figure 15:
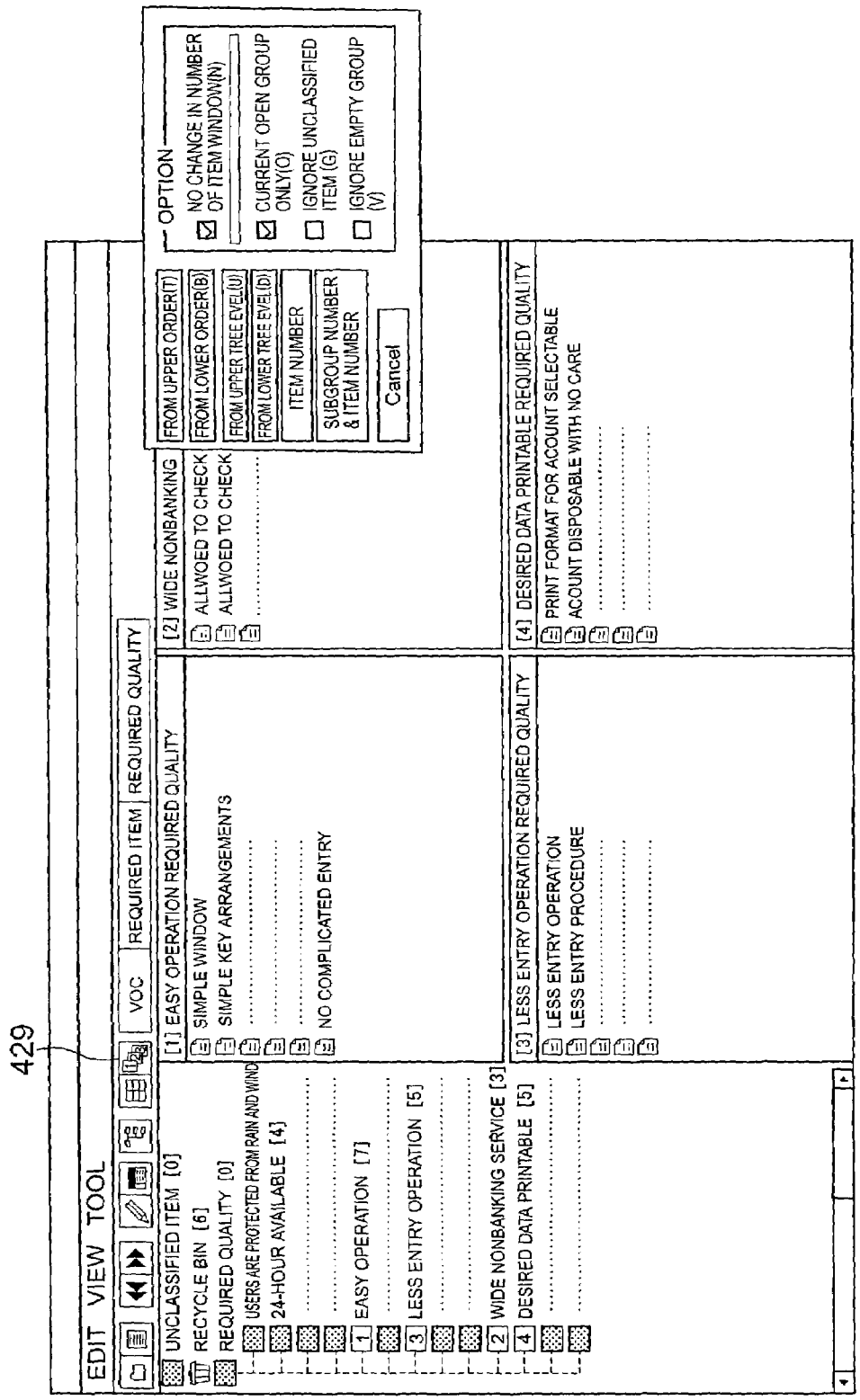
FIG. 15 is an illustration of on-screen operations in rearrangements of the order of displaying item windows.

Moreover, the user is allowed to depress the contents-view-window rearrangements icon 429 to display windows such as shown in FIG. 15. These windows offer the user a window-rearrangements function under several requirements, such as, rearranging item windows IW in order of the number of groups having larger number of items or in order of groups displayed on the group window GW.

Groups or items are subjected to the batch processing when selected on an item window with the shift key. This allows the user to shift or delete the selected groups or items at the same time with the drag-and-drop operation or using a delete key.

The user is further allowed batch processing to all items in a group through appointment of the group and execution of commands on the group operation menu.

An item-processing command is different from a group-processing command for quick batch item processing.

This embodiment offers automatic creation of groups from items. When the user wants to set a subitem under an item, a group that used to have the subitem may be converted into the item, in idea drawings. The automatic item-to-group conversion or vise versa offers quick user operations. Groups may be automatically deleted when they have no elements such as items any longer.

Several duplicate items are deleted at the same time according to the requirements of deletion specified by the user with selection of the tool "delete duplicate data" on the tool icon 413.

The user is allowed to delete groups or items. Prepared as the requirements of deletion are "all item character strings and all attributes are identical" and "item character strings are identical". The user can select either of the requirements to delete duplicate data.

[6-3. Automatic Classification]

Items can be automatically classified into groups in accordance with their attribute values and displayed on different item windows according to groups.

The user is allowed this automatic classification with specifying the attributes under selection of the command "classify by attribute" on the operation menu in on-screen group handling or on the operation menu in the group window displayed by clicking the edit icon 411. The attribute values are used as group names.

Therefore, the tasks for the user are just selection of the command "classify by attribute" and specifying the attributes. Hence, the user can quickly check the results of classification on the several item windows.

Another type of automatic classification offered in this embodiment is classification according to key words.

The user is allowed this automatic classification with selection of the tool "execute external application" and the command "classify by key word" on the tool icon 413. The list of all items is then displayed and the number of words often appearing in the items is counted. For example, top ten most appeared words are selected as keywords to initiate the automatic classification according to whether the items contain these key words. The items are divided into groups according to the key words and displayed on the item windows according to the groups. The keywords are used as group names.

Accordingly, the tasks for the user are just selection of the tool "execute external application" and the command "classify by key word". Hence, the user can quickly check the results of classification on the several item windows.

In this keyword-based classification, the user may be allowed to set the number of words as requirements of classification or select keywords among automatically extracted keyword candidates. This offers user-initiative keyword-based classification.

[6-4. File Merge]

Data of a file are loaded and merged when the file is selected other than another data file now open, with the tool "file merge" on the tool icon 413. If the user selects the tool "delete duplicate data" in execution of "file merge", data identical to items in the current data are automatically deleted from the loaded data, thus items having not duplicates being only merged.

Moreover, identical data over hierarchies, groups, etc., are consolidated in "file merge" procedure whereas unconsolidated but identical items are merged into a new group, thus work data created separately being merged into one group.

In addition, a loaded file may be modified in accordance with the results of classification on work data opened now, the results automatically coming first and reflected on the loaded file. Furthermore, work data may be modified in accordance with classification of other work data of a data file given high priority beforehand or at the time of file loading, thus work data created separately being modified and merged in accordance with classification of user-specified work data.

[6-5. Result-View Window]

The result-view window icon 424 allows the user to display a result-view window different from the classification window. The result-view window may be composed of one display format. Or, several different types of window format may be offered which allows the user to select any format for checking and evaluating the results of classification from several points of view.

Figure 9:
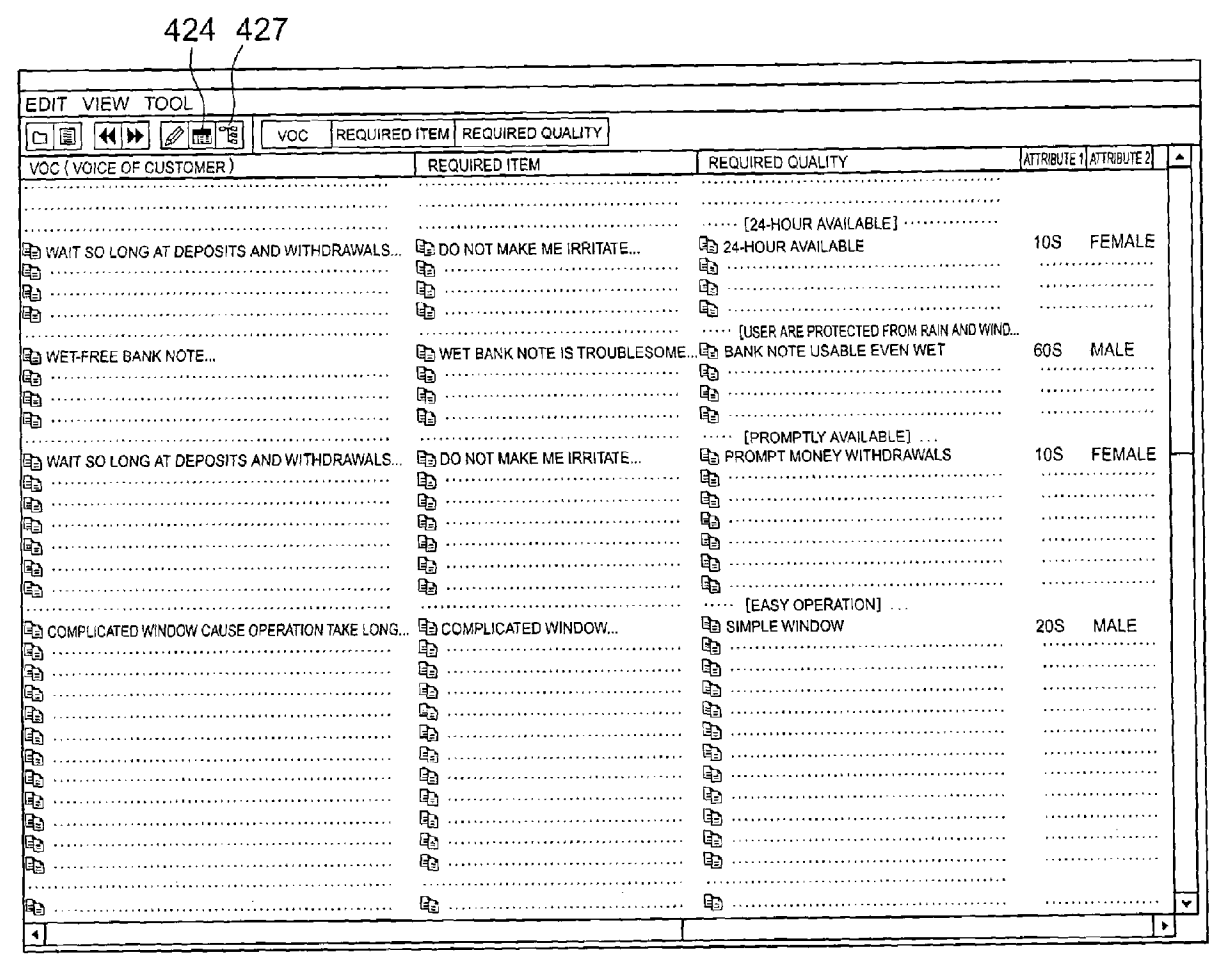
Figure 10:
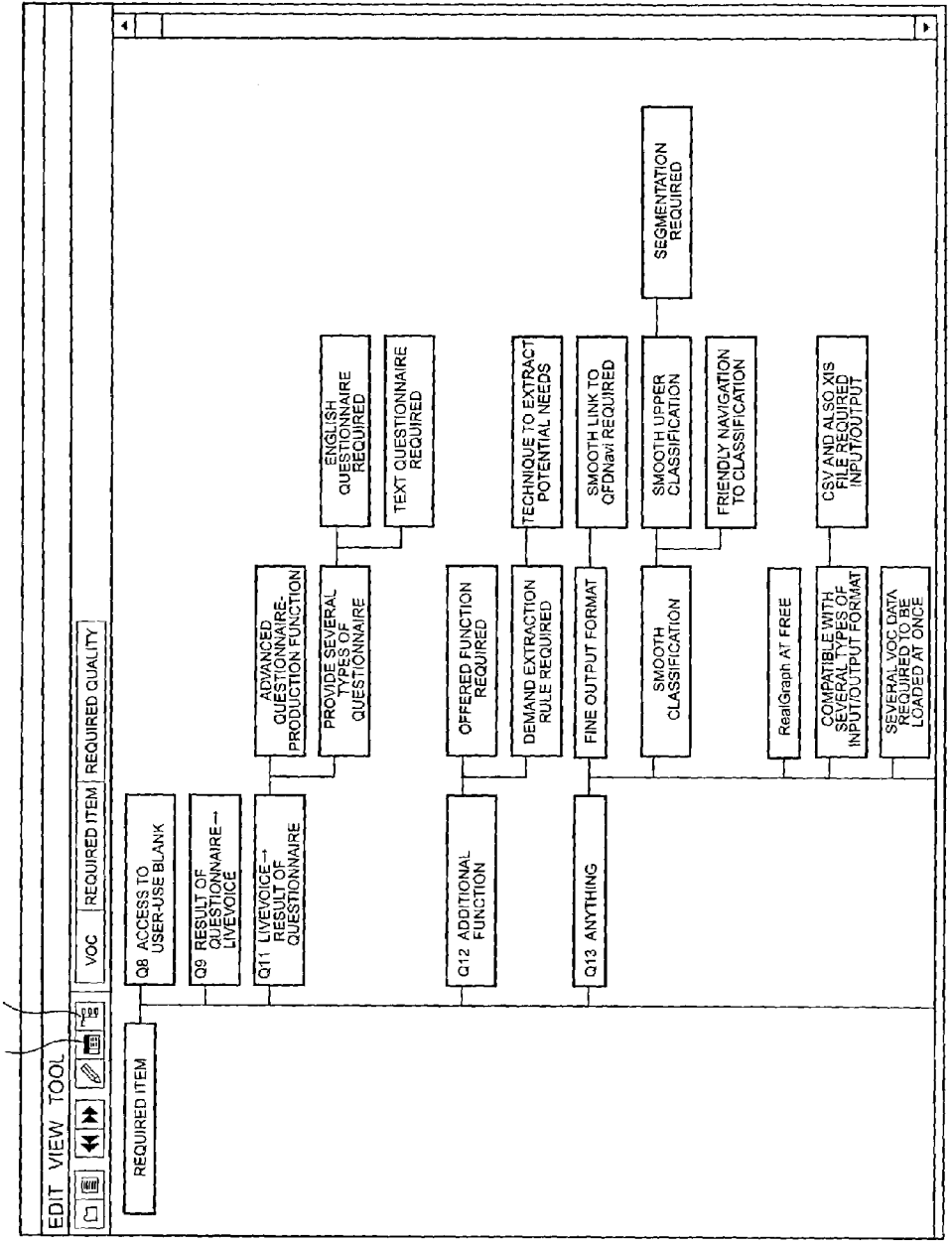
FIG. 10 is an illustration of a tree-diagram screen displayed on completion of the data-organization support procedure shown in FIG. 1.

Illustrated in FIGS. 9 and 10 is view selection between two types of window format. FIG. 9 shows a table screen for displaying a list of items according to hierarchy. FIG. 10 shows a tree-diagram screen for displaying a graph of tree diagram.

The table screen and the tree-diagram screen are switched by a single action of clicking a table-screen icon 424 or a tree-diagram-screen window icon 427, shown in FIGS. 9 and 10.

Accordingly, not only the table screen but also the tree-diagram screen for displaying a graph of tree diagram offer quick check of specific data structures in the results of classification or the total structure.

Not only one result of classification but also several results of classification may be offered to several items. The results of classification may be displayed at the same time or alternately. This modification can be applied for several purposes. For example, if item attributes include age group and gender for persons who have ideas, a result of classification according to age group and that according to gender are compared with each other for check of change in trend of ideas.

ADVANTAGES

The data-organization support procedure in this embodiment disclosed above has the following advantages:

The contents of several groups are displayed on several item windows while the group hierarchy is displayed on a group window, at the same time.

This simultaneous displaying function allows the user efficient data classification according to needs while simultaneously checking the contents of several groups and the group hierarchy. This function offers user-friendly operations such as change in groups to which items or subgroups belong only by shifting the items or the subgroups over several item windows.

Moreover, the displayed contents in or after shifting of items or groups directly indicate change in groups to which items or subgroups belong or the contents of changed groups. This function allows the user to visually check the operation or the contents of each group at present. Thus, the user can easily check the advancements in classification and decide the next operation. This function therefore offers efficient user-initiative classification.

Furthermore, groups can be "opened" or "closed" in item windows according to group appointments or release. Thus, the user can "open" any groups to check the contents according to needs. In addition, the user is allowed to "close" the groups already checked or processed or useless groups, in other words, "open" the needed groups only for efficient classification.

Moreover, new groups can be automatically created with item drag-and-drop operations over several item windows only, thus this function offering user-friendly operations.

Furthermore, the relationships between groups can be automatically modified with group drag-and-drop operations within the group window only, thus this function offering user-friendly operations. In addition, operations to groups in the group window allow the user to change the status of item windows and the displayed contents.

The user is allowed to "open" any group not only by selecting the group in the group window but also dragging it in the group window and dropping it into an item window. In particular, the user is allowed to "open" a group in any item window displayed on a designated location on screen by selecting a group destination. This function thus offers efficient classification with appropriate selection of a display location. In addition, a single operation of "closing" an already "opened" group and "opening" a new group achieves high efficiency.

A new group can be "opened" in one of item windows (all opened) without the user tasks of selecting this window or closing the other item windows, for enhanced operability.

In detail, it is automatically determined whether the number of item windows has reached the maximum window number. If negative, the number of item windows is increased and a new group is "opened" in one of the new item windows. In contrast, if positive, a group of the least priority in use is automatically "closed" and a new group is "opened" in place of the "closed" group.

The user task for changing the number of item windows to be displayed is just the number settings. This function allows the user to display the optimum number and size of item windows according to needs, such as, displaying the contents of groups in a large window if needed groups are few, thus achieving high classification efficiency.

In reviewing and classification of data per level of hierarchy, all groups at each level can be simultaneously "opened" by specifying the levels one by one without selecting each group, thus this function achieving high efficiency.

The commands "classify by attribute" for automatic classification according to attributes and "classify by keyword" for automatic classification according to keywords achieve high classification efficiency.

The table screen and also the tree-diagram screen for displaying a graph of tree diagram offer quick check of specific data structures or the total structure in the results of classification.

Switching the display of several results of classification over several items allows the user to check and evaluate the results from several points of view.

Already stored results of classification are reusable for new classification procedure, thus achieving high classification efficiency.

Automatic merger of several classification results obtained through different operations offers high operational efficiency, especially, in merger of a huge number of classified data. This function thus allows the user to effectively utilize several types of classified data.

8. Other Embodiments

Not only the embodiment disclosed above, but also several different types of embodiments are feasible under the scope of the present invention.

First of all, the procedures shown in FIGS. 1, 6 and 8 are just examples in this invention. In other words, the procedures can be modified, as long as, capable of giving the same supports to the user in classification procedure.

The relationships among mouse manipulations such as drag-and-drops and double-clicks, the corresponding actions on screen and the resultant data contents disclosed above are just examples. For example, the double-click operation can be changed to a single-click operation. In other words, these relationships can be modified in accordance with procedures, classification window, data to be processed, operation modes, etc.

Moreover, the window formats for the classification window, the result-view window, etc., are selectable. For example, several item windows may only be displayed as the classification window while the group window in closed for simple grouping with no hierarchy. In addition, displaying and modifications to group hierarchy are achieved by, for example, "opening" groups at different levels of hierarchy and dragging and dropping the groups over several opened windows without opening the group window.

Furthermore, data types to be subjected to the classification procedure according to the present invention are selectable among, such as, sentences expressing ideas, files, folders, and so on. In other words, the present invention is feasible to classification of several types of data, such as, sentences, character strings, graphics, symbols and marks, offering the same advantages.

In addition, classified data under the present invention may be output in several formats such as files that match the displays on windows.

As disclosed above in detail, the present invention provides the data-organization support method and the program for supporting data organization that offer efficient user-initiative data classification with simple window operations while checking the contents of several groups displayed on several windows.

It is further understood by those skilled in the art that the foregoing description is a preferred embodiment of the disclosed device and that various change and modification may be made in the invention without departing from the spirit and scope thereof.

What is claimed is:

1. A computer-aided data-organization support method for classifying data into a plurality of groups, the method comprising:

displaying a group window for displaying a hierarchy of all of the plurality of groups in a first display area on a computer screen, each of the groups having elements;

arraying and displaying a first number of contents-view windows in a second display area on the computer screen, each of the contents-view windows being capable of being set to display or not display a list of elements of each group;

classifying the data on the computer screen, including:

selecting an element displayed in a first contents-view window in which a list of elements is displayed;

shifting the element from the first contents-view window to a second contents-view window;

if the element is shifted to the second contents-view window, then processing data to decide a group to which the element belongs, the group corresponding to the second contents-view window;

selecting a group displayed in the group window;

if the group is selected, then setting a contents-view window corresponding to the group to be of contents-view-state where a list of elements of the group is displayed, and displaying the contents-view window in the second display area;

releasing selection of the group; and if selection of the group is released, then setting the contents-view window corresponding to the group to be of non-contents-view-state where the list of elements of the group is not displayed, and displaying the contents-view window of non-contents-view-state with other contents-view windows of contents-view-state in the second display area; and storing at least one result of the data classification.

2. The computer-aided data-organization support method according to claim 1, wherein the processing of data includes, if the second contents-view window is of non-contents-view state, then setting the second contents-view window to be of contents-view-state, creating a new group corresponding to the second contents-view window in the group window, and processing the element shifted to the second contents-view window to be included to the new group.

3. The computer-aided data-organization support method according to claim 2, wherein the classifying of the data includes processing a group that is selected and shifted in the group window, the group being regarded as shifted to a particular level of the hierarchy corresponding to a location of the shifted group.

4. The computer-aided data-organization support method according to claim 3, wherein the processing of the group includes switching one of the contents-view windows from being of contents-view-state to being of non-contents-view-state or vice versa or the displayed contents in accordance with an operation to the group displayed on the group window.

5. The computer-aided data-organization support method according to claim 4, wherein the switching includes displaying a list of elements of a group that is selected on the group window and shifted to one of the contents-view windows, irrespective of whether the one of the contents-view windows is of contents-view-state or non-contents-view-state.

6. The computer-aided data-organization support method according to claim 4, wherein the switching includes deleting a list of elements of a group of low priority in use, when a group is specified, among lists of elements displayed on the contents-view windows that are all opened, and displaying a list of elements of the specified group on a contents-view window from which the list of elements has been deleted.

7. The computer-aided data-organization support method according to claim 3, wherein the classifying of the data includes switching data-classifying procedures according to whether targets to be subjected to the data classification is one or several elements, one or several groups, or both of the elements and groups.

8. The computer-aided data-organization support method according to claim 1, wherein the classifying of the data includes:

changing the first number of the contents-view windows to be displayed when a number of groups to be displayed on the windows is changed; and displaying the changed first number of contents-view windows.

9. The computer-aided data-organization support method according to claim 1, wherein the classifying of the data includes:

changing the first number of the contents-view windows to be displayed when a number of groups to be displayed on the windows is specified; and displaying the changed first number of contents-view windows.

10. The computer-aided data-organization support method according to claim 1, wherein the classifying of the data includes classifying the data in accordance with at least one attribute specified for the data.

11. The computer-aided data-organization support method according to claim 1, wherein the classifying of the data includes displaying lists of elements at once for all groups at a specified level of hierarchy.

12. The computer-aided data-organization support method according to claim 1 further comprising displaying the stored result of the data classification in a specific format, and wherein the displaying of the stored result includes displaying a tree-diagram screen for displaying a graph expressing a tree diagram of the result of the data classification.

13. The computer-aided data-organization support method according to claim 1 further comprising displaying the stored result of the data classification in a specific format, and wherein the displaying of the stored result includes switching and displaying a plurality of results of the data classification for each data.

14. The computer-aided data-organization support method according to claim 1 further comprising combining a plurality of results of the data classification with reforming several of the results of the data classification into a format of a specified result among the results of the data classification.

15. The computer-aided data-organization support method according to claim 1 further comprising combining a plurality of results of the data classification at same level of hierarchy, same group or same data while creating new groups for the results of the data classification at different levels of hierarchy, different groups or different data.

16. A computer-readable medium containing instructions which, when executed by a processor, cause a computer to perform a method of classifying data into a plurality of groups, the method comprising:

displaying a group window for displaying a hierarchy of all of the plurality of groups in a first display area on a computer screen, each of the groups having elements;

arraying and displaying a first number of contents-view windows in a second display area on the computer screen, each of the contents-view windows being capable of being set to display or not display a list of elements of each group;

classifying the data on the computer screen, including:

selecting an element displayed in a first contents-view window in which a list of elements is displayed;

shifting the element from the first contents-view window to a second contents-view window;

if the element is shifted to the second contents-view window, then processing data to decide a group to which the element belongs, the group corresponding to the second contents-view window;

selecting a group displayed in the group window;

if the group is selected, then setting a contents-view window corresponding to the group to be of contents-view-state where a list of elements of the group is displayed, and displaying the contents-view window in the second display area;

releasing selection of the group; and if selection of the group is released, then setting the contents-view window corresponding to the group to be of non-contents-view-state where the list of elements of the group is not displayed, and displaying the contents-view window of non-contents-view-state with other contents-view windows of contents-view-state in the second display area, and storing at least one result of the data classification.

17. The computer-readable medium according to claim 16, wherein the processing of data includes, if the second contents-view window is of non-contents-view-state, then setting the second contents-view window to be of contents-view-state, creating a new group corresponding to the second contents-view window in the group window, and processing the element shifted to the second contents-view window to be included to the new group.

* * * * *